(12) United States Patent
Tabatabaei et al.

(10) Patent No.: US 7,164,999 B2
(45) Date of Patent: Jan. 16, 2007

(54) DATA-DEPENDENT JITTER (DDJ) CALIBRATION METHODOLOGY

(75) Inventors: Sassan Tabatabaei, Sunnyvale, CA (US); Touraj Farahmand, Burnaby (CA)

(73) Assignee: Guide Technology, Inc., Sunnyvale, CA (US)

( * ) Notice: Subject to any disclaimer, the term of this patent is extended or adjusted under 35 U.S.C. 154(b) by 0 days.

(21) Appl. No.: 11/269,146

(22) Filed: Nov. 8, 2005

(65) Prior Publication Data

US 2006/0120444 A1    Jun. 8, 2006

Related U.S. Application Data

(60) Provisional application No. 60/625,889, filed on Nov. 8, 2004.

(51) Int. Cl.
*G01R 35/00* (2006.01)
*H04Q 1/20* (2006.01)
(52) U.S. Cl. .................................................. 702/106
(58) Field of Classification Search ................ 702/106
See application file for complete search history.

(56) References Cited

U.S. PATENT DOCUMENTS

| | | | |
|---|---|---|---|
| 2004/0136450 A1* | 7/2004 | Guenther | 375/226 |
| 2005/0177758 A1* | 8/2005 | Stickle | 713/400 |
| 2006/0047450 A1* | 3/2006 | Tabatabaei et al. | 702/69 |

* cited by examiner

*Primary Examiner*—John Barlow
*Assistant Examiner*—Cindy D. Khuu
(74) *Attorney, Agent, or Firm*—Dority & Manning, P.A.

(57) ABSTRACT

The present subject matter relates to methodologies for providing error correction compensation to measurement systems. Data-dependant jitter may be compensated by examining both short-term and long-term bit histories after applying a predetermined synthesized calibration pattern having selected characteristics to the measurement system. Neural networks may be provided to produce error correction signals that may be applied to measured data on a bit-by-bit basis to correct jitter. The synthesized calibration sequence may correspond to a base pattern having two segments; a first segment may correspond to a copy of the base pattern while the second segment may be a copy of the base pattern with some sections inverted.

16 Claims, 7 Drawing Sheets

DATA-DEPENDENT JITTER (DDJ) CALIBRATION METHODOLOGY

CROSS REFERENCE TO RELATED APPLICATIONS

This application claims priority under 35 USC 119(e) of Provisional Patent Application Ser. No. 60/625,889 filed Nov. 8, 2004, entitled "DDJ Calibration Methodology," which is hereby incorporated by reference in its entirety.

FIELD OF THE INVENTION

The present subject matter relates to methodology for calibrating test equipment to compensate measurements from the effects of data-dependent jitter.

BACKGROUND OF THE INVENTION

Data-dependent jitter often is present when transmitting high-speed serial signal through physical connectors. DDJ in systems can degrade data throughput in systems and degrade measurement accuracy of high-speed test and measurement equipment. To avoid the loss of accuracy in test equipment and fixtures, special calibration methodologies are required to reduce the DDJ impact.

Data-dependent jitter (DDJ) may be defined as data-dependent variations of the data transition edges relative to their ideal position in time. Causes of DDJ include non-50% duty cycles, Inter-symbol interference, non-linear phase of the transmission path, and reflections.

Non-50% duty cycle is often referred to as Duty-Cycle Distortion or DCD. The root causes include imbalance in the driver source and sink current, non-linear loads, marginal timing of output drivers, and common-mode voltage in differential signals.

Inter-symbol interference (ISI) generally results from transmission path response. Bandwidth limitation of the transmission path causes the spread of the bit energy over longer time, resulting in energy leakage into the adjacent bits. In other words, preceding bits will affect an edge transition.

Non-linear phase of the transmission path results in variable frequency dependent group delay. Since the instantaneous frequency content of a data signal varies with transition density, non-linear phase can result in edge shifts depending on the preceding bit history.

ISI for each transition depends on the preceding bit history. Typically, the effect of preceding bits sequence on a bit transition diminishes as time interval between the transition and the preceding bits increases.

Any impedance discontinuity in transmission path results in reflections. The reflected bits may affect a data transition edge, which may result in jitter. This type of jitter also depends on the preceding bits, but unlike ISI, it mainly dependent on specific bits prior to the edge transition not a combination of all preceding bits. This type of DDJ changes significantly with bit rate and/or transmission path length variations.

In many applications, ISI and short-path reflections are major DDJ sources. In such cases, it is only necessary to consider a limited number of preceding bit history to account for DDJ. This number may be referred to as "ISI depth".

While various calibration methodologies have been developed, no methodology has emerged that generally encompasses all of the desired characteristics as hereafter presented in accordance with the present subject matter.

SUMMARY OF THE INVENTION

The present subject matter relates to calibration methodologies and, in particular, to methodologies to compensate for data-dependant jitter. The present methodology is directed to a general-purpose methodology that can be applied in many practical situations, but in a specific example may be used to calibrate a GuideTech model GT4000 DDJ to sub-10 ps levels.

The technique in accordance with the present technology measures jitter for each edge of the pattern for a data signal with repetitive pattern. Multiple measurements for each edge and averaging eliminate the random jitter (RJ) and periodic jitter (PJ) components, and result in a number of edge timing shifts. Due to finite number of edge shifts, the probability distribution function of DDJ appears as a number of delta lines.

Additional objects and advantages of the present subject matter are set forth in, or will be apparent to, those of ordinary skill in the art from the detailed description herein. Also, it should be further appreciated that modifications and variations to the specifically illustrated, referred and discussed features and elements hereof may be practiced in various embodiments and uses of the invention without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
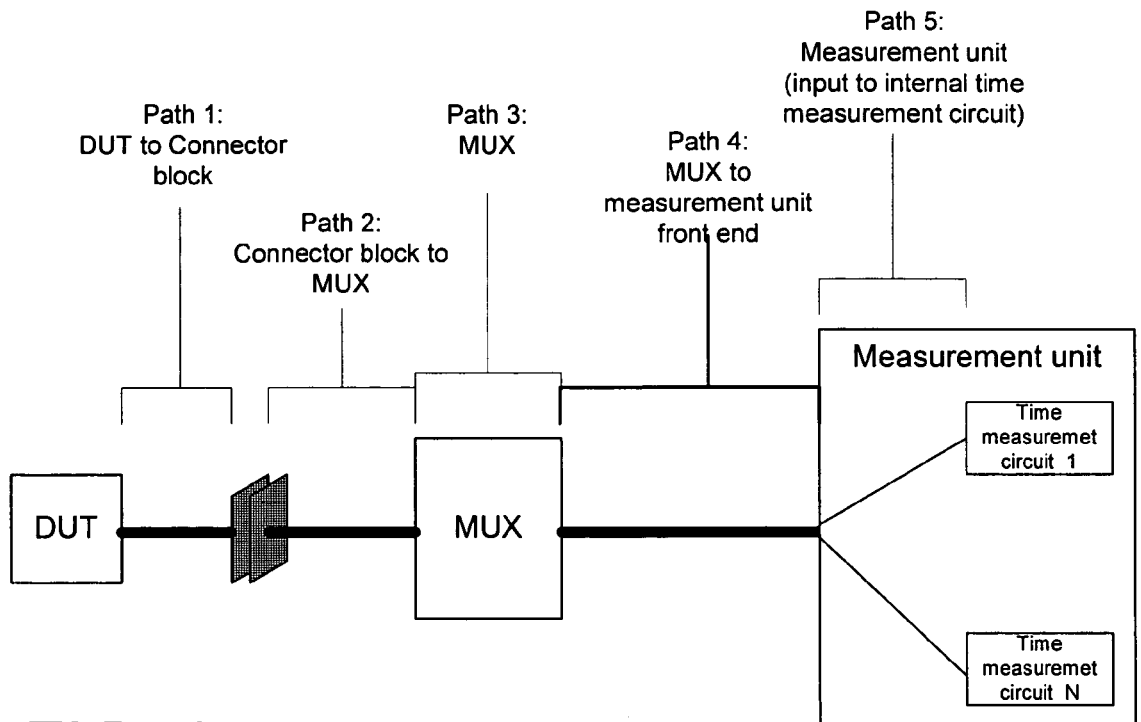
FIG. 1 illustrates exemplary measurement system paths that contribute to intrinsic data-dependant jitter (DDJ)

Repeat use of reference characters throughout the present specification and appended drawings is intended to represent same or analogous features or elements of the invention.

DETAILED DESCRIPTION OF THE PREFERRED EMBODIMENTS

As discussed in the Summary of the Invention section, the present subject matter is particularly concerned with calibration methodologies designed to compensate for data-dependant jitter present in measurement instrumentation or test fixture.

As an general example of the present technology, significant portions of the present disclosure will make reference to a particular measurement device available from Guide-Tech, the model GT4000. It should be kept in mind, however, that the use of this particular device is not a requirement of the present technology, but rather is an exemplary device with which the present calibration methodology may be employed.

The GuideTech GT4000 is a continuous time interval analyzer (CTIA), which is capable of measuring a wide variety of timing and jitter parameters, including data-dependant jitter (DDJ). GuideTech's jitter analysis package (DCA), measures jitter using edge marking and averaging technique. The technique in accordance with the present technology measures jitter for each edge of the pattern for a data signal with repetitive pattern. Multiple measurements for each edge and averaging eliminate the random jitter (RJ) and periodic jitter (PJ) components, and result in a number of edge timing shifts. Due to finite number of edge shifts, the probability distribution function of DDJ appears as a number of delta lines.

Data-dependent jitter (DDJ) measurements from the measurement system that includes a GT4000 continuous time interval analyzer (CTIA) and signal interfaces are subject to the internal DDJ of the measurement system. This DDJ is typically due to limited bandwidth, non-linear phase response, in addition to long-path and short-path reflections. DCD also may be affected due to non-linear behaviour of some internal buffers/circuits or skew between internal paths.

Reference will now be made in detail to the presently preferred embodiments of the subject calibration methodologies. With specific reference now to FIG. 1, there is illustrated a typical measurement system setup.

Factors affecting Data-dependent jitter (DDJ) include: Cables and connectors from a device under test (DUT) to measurement system connector block front end; cables from the connector block to a MUX input connectors; the MUX internal paths; cables from MUX to the inputs of the DDJ measurement unit; and the path from DDJ measurement unit inputs to the internal timing measurement circuit, for example, interpolators within the GT4000.

Previous tests performed at GuideTech indicate that DDJ may vary by as much as 30 ps due to these effects over different bit rates and patterns. The test repeatability, however, is within 1 ps for a specific bit rate and pattern. This suggests that if internal GT4000 DDJ is characterized and calibrated for each bit rate and pattern selection, a calibration factor may be applied to measurements to recover the lost accuracy.

The most general DDJ calibration methodology is to extract a model for the complete signal path that cause DDJ including all relevant factors, such as frequency response, non-linear effects, and reflections. Using the model, an inverse response can be derived to compensate for the total path impact, which will correct DDJ as well. This method, however, requires generation of well-controlled input stimuli over a wide-range of conditions, and complex system identification procedure. The major drawback of this method is extreme DDJ sensitivity to amplitude measurement accuracies. In practice, such sensitivity can render the calibration impractical.

Another method is to assume that regardless of DDJ content, the frequency content of the measurement system input signal is known and does not change significantly. This assumption leads to a important DDJ property as stated by the following first assumption: Assumption 1: The input signal DDJ and measurement system DDJ are additive on per-edge basis.

Referring to FIG. 1, the first assumption is true in a large set of signal and conditions from the input of the MUX the internal CTIA, because of the high gain comparator typically used at the MUX inputs. This comparator passes its input signal phase information almost without any alteration, but reset the voltage domain signal to one that is a function of the comparator characteristic, and hence is independent of the input signal shape (and frequency content) to a large extent. The exception is when the signal include large amount of high frequency jitter, which may results in significant DDJ variation due to frequency response limitations and short-path reflections.

Based on this first assumption, an effective calibration strategy is to build a compensation table for each bit rate and pattern combinations by measuring measurement system DDJ using DDJ-free input signals or signals whose per-edge DDJ is characterized to 1 ps accuracy. The entries of the table corresponding to the input signal bit rate and pattern is subtracted from DDJ measurement on per-edge basis to correct for measurement system DDJ.

The above method is only practical as a focused calibration method, which basically requires a single calibration table for the target application pattern and bit rate. This, however, will have to be run by users on per-case basis, which makes the use of measurement system somewhat difficult. Attempting to use this method as a general calibration method independent of bit rate and pattern quickly becomes impractical when considering infinite number of pattern and bit rate selection that a user may select.

To converge to a practical general calibration methodology, the following two assumptions may be made: Assumption Two: The dominant measurement system DDJ components are the ones that are due to the short-term bit history immediately before each transition. Assumption Three: Per-edge DDJ versus bit rate characteristics is highly correlated within narrow bit rate span ranges, generally from 10 Mbps to 100 Mbps bit rate span.

Assumption Two is true for DDJ impact from transmission path frequency response and short-path reflections. However, typically this assumption will not hold in the presence of long-path reflections. Even if assumption two does not hold, the calibration based on this assumption will improve DDJ accuracy by calibrating out the short-term history related DDJ.

Assumption Three is typically true for most systems. Discontinuity or sharp variations of DDJ versus bit rate indicate significant design problem and/or faults. Extensive testing of GT4000 characteristics has validated this assumption.

Assumptions One, Two, and Three allow deployment of a generalized DDJ calibration methodology. Such method includes the following steps: apply a selected finite set of signals with known bit rates and pattern to measurement system; measure Inter-symbol interference (ISI) and Duty-Cycle Distortion (DCD); eliminate ISI due to the long-term bit history; use the measured ISI and DCD to train a neural network (NNet); and correct the DDJ measurements.

When applying a selected finite set of signals with known bit rates and pattern to the measurement system, a single pattern with rich set of bit history combinations is the best choice. An exemplary single pattern is 10-bit Pseudo Random Binary Sequence (PRBS10). Inter-symbol interference (ISI) measurements should be synchronized for each bit rate to the pattern to obtain ISI for each specific pattern edge.

To correct DDJ measurements, measurement system measures raw DDJ (ISI and DCD) and estimates bit rate. The neural network (NNet) generates per-edge correction offsets using the estimated bit rate and the pattern. This calibration offsets are subtracted from the measured DDJ on per-edge basis to obtain accurate DDJ estimate of the input signal.

Data-dependant jitter (DDJ) due to long-term bit history before an edge (LT-DDJ) is typically due to reflections within long transmission lines. Such DDJ cannot be calibrated based on the short-term bit history DDJ (ST-DDJ) calibration method previously described. In addition, if not eliminated, LT-DDJ can also cause error in the calibration (NNet training) data sets. This error will cause systematic errors in calibration coefficients, which in turn reduces the DDJ correction accuracy even for ST-DDJ.

To eliminate LT-DDJ a technique has been devised to measure ISI for two edges within the pattern such that the polarity of the ST-DDJ for both measurements is the same, but the LT-DDJ of one is negated relative to the other one. We define short-term history as bits 1 to $N_B$ immediately preceding an edge, and long-term bit history as bits $N_B+N_n$ to $N_B+N_n+N_{LT}$ immediately preceding that edge. $N_n$ denotes the number of bits prior to the $N_B$ bits short history that affect neither the ST-DDJ nor LT-DDJ significantly, and $N_{LT}$ is the number of bits that impact LT-DDJ. Subsequently, patterns are selected that satisfy the following two conditions for some or all edges: (1) the short-term bit history is repeated twice within the pattern, and (2) the long-term bit histories preceding immediately before those two similar short-term histories are inverted relative to each other. The characteristics of the system dictate the choices of $N_B$ and $N_{LT}$ values.

Figure 2:
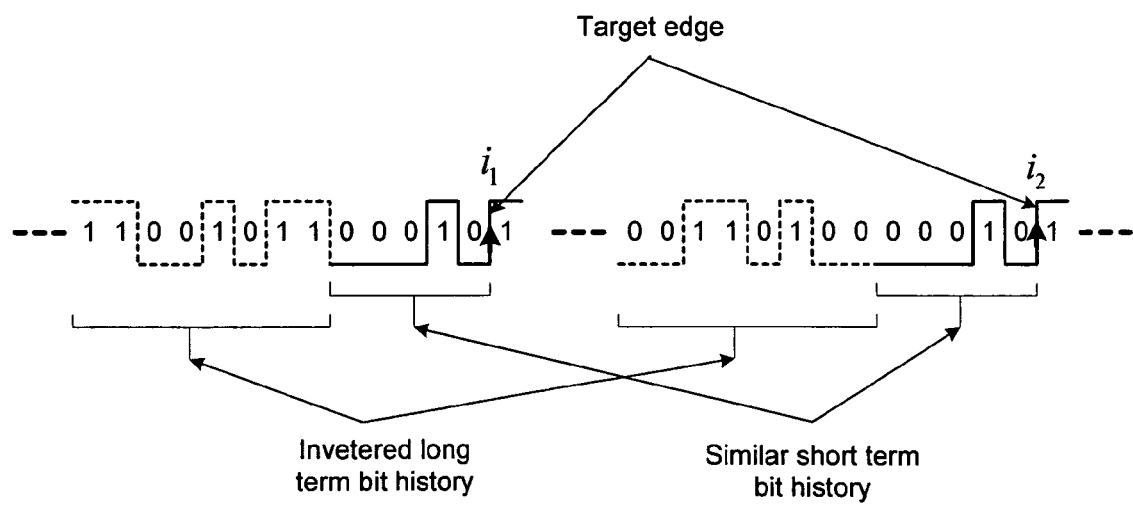
FIG. 2 illustrates a process for pattern synthesis for long term bit-history related data-dependant jitter (LT-DDJ) elimination in accordance with the present subject matter.

FIG. 2 illustrates an example of pattern synthesis for LT-DDJ elimination. In this example $N_B$=5, and $N_{LT}$=8. The DDJ for the edges $i_1$ and $i_2$ can be expressed as below:

$$DDJ(i_1) = DDJ_{ST}(i_1) + DDJ_{LT}(i_1) \quad \text{Eq. 1}$$

$$DDJ(i_2) = DDJ_{ST}(i_2) + DDJ_{LT}(i_2)$$

$$DDJ_{ST}(i_2) = DDJ_{ST}(i_1)$$

$$DDJ_{LT}(i_2) = -DDJ_{LT}(i_1)$$

where DDJ(i), $DDJ_{ST}$(i), $DDJ_{LT}$(i) are the total DDJ, ST-DDJ, and LT-DDJ for the i-th edge. ST-DDJ and LT-DDJ is computed from Eq. 2 as below:

$$DDJ_{ST}(i_1) = \frac{DDJ(i_1) + DDJ(i_2)}{2} \quad \text{Eq. 2}$$

$$DDJ_{LT}(i_1) = \frac{DDJ(i_1) - DDJ(i_2)}{2} \quad \text{Eq. 3}$$

The above equation show that this method of eliminating LT-DDJ can also be used to separate LT-DDJ and ST-DDJ. Such method can also be used as a diagnosis and characterization method, where it may be necessary to identify and measure the ST-DDJ and LT-DDJ separately. Since the sources of LT-DDJ and ST-DDJ are often different, identifying them separately helps to diagnose and possibly resolve major sources of DDJ. It is difficult to generate patterns that satisfy the two conditions for all $2^{N_B}$ combinations of $N_B$ short-term bit histories. Instead, we select a base pattern that contains all different $2^{N_B}$ combinations of $N_B$ short-term bit histories. Typically PRBS patterns with length of $(2^{(N_B+1)}-1)$ satisfy such requirement. Subsequently, we synthesize derivative patterns from the base pattern, such that each one satisfies condition #1 and #2 for a subset of corresponding edges in the base pattern. These "synthesized calibration pattern (SCP)" are generated as described below.

Figure 3:
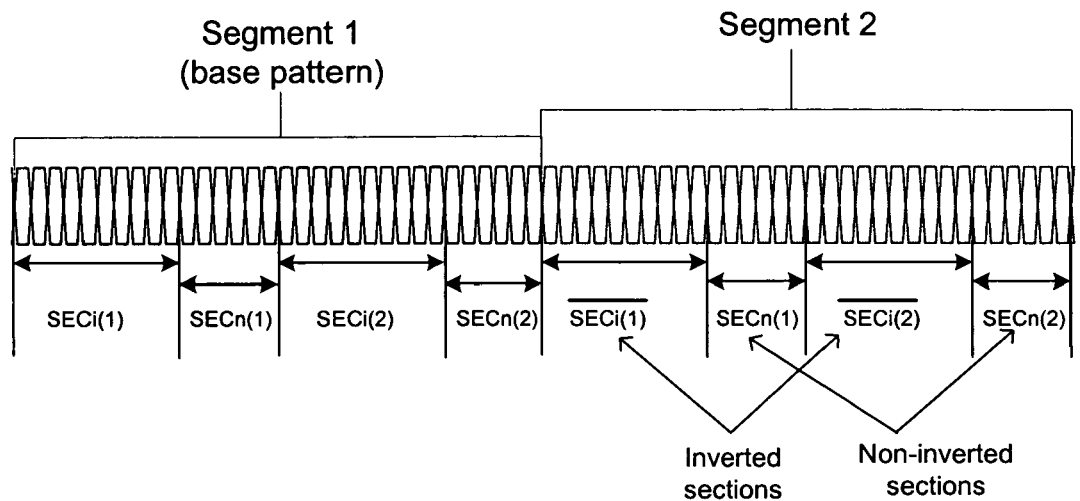
FIG. 3 illustrates an exemplary long term bit-history related data-dependant jitter (LT-DDJ) elimination synthesized calibration pattern (SCP) in accordance with the present subject matter.

Assume the base pattern length is $patLen_{base}$. All SCPs have two segments. First segment is a copy of the base pattern. The second segment is also a copy of the base pattern but with some sections inverted. FIG. 3 illustrates an SCP example.

Figure 4:
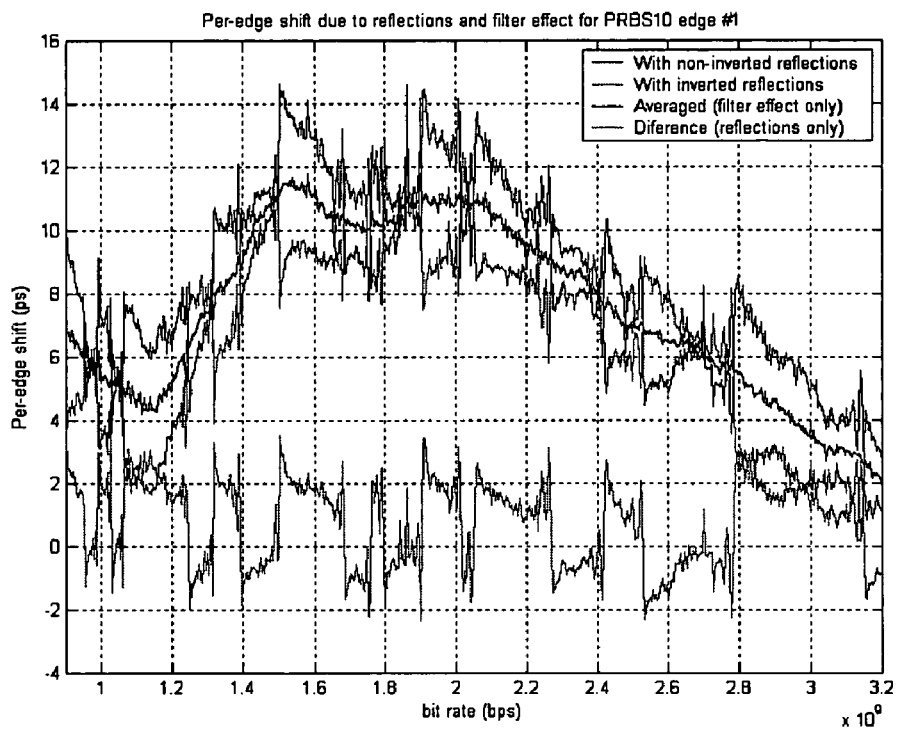
FIGS. 4 and 5 respectively graphically illustrate short-term bit history DDJ (ST-DDJ) and long term bit-history related data-dependant jitter (LT-DDJ) responses using an exemplary correction methodology in accordance with the present subject matter.
Figure 5:
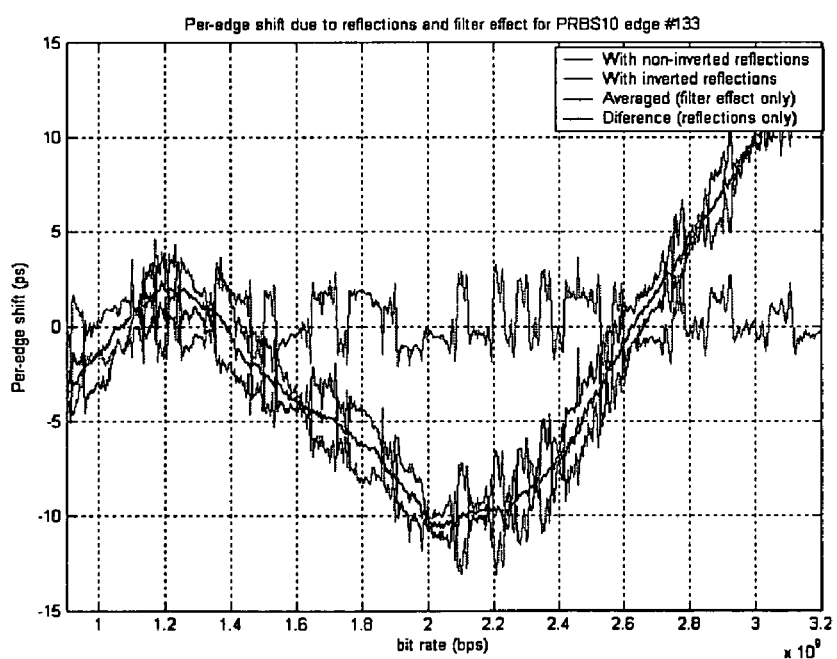

The number of bits in the non-inverted and inverted sections are $N_B+N_n$ and $N_{LT}$, respectively. Any transition within the last $N_n$ bits of any non-inverted section satisfies the both condition #1 and #2. Note that in the example shown in FIG. 3 the SCP has two non-inverted sections in each segment, LT-DDJ elimination can be performed on any transition within $2N_n$ bits. To ensure all base pattern transitions are covered, the base pattern must be rotated by $N_n$ bits to generate another SCP. In general $[(N_B+N_n+N_{LT})/N_n]$ ([X]=(integer part of X)+1) SCPs will be required to ensure LT-DDJ can be eliminated on all edges within the base pattern. Using $N_B$=9, $N_n$=20, and $N_{LT}$=85, and using PRBS10 as base pattern for an example circuit. This requires 6 SCPs, each with length of 2046. FIGS. 4 and 5 show how the ST-DDJ and LT-DDJ responses are separated using this technique for two selected edge #1 and #133. In this board, the LT-DDJ is primarily due to reflection within internal 13.5 ns delay line, which is due to a cable assembly.

The proposed method in accordance with the present technology is based on Feed-Forward Neural Network (FFNN) nonlinear modeling. Such modeling can be trained for classification and generalization of DDJ per-edge shifts of internal paths with any patterns at any bit rate up to maximum operating bit rate of the equipment. The technique uses only DDJ data, that is, it doesn't require knowledge of the signal in voltage domain. The model needs only DDJ per-edge information at limited number of bit rate (10 Mbps to 100 Mbps step sweep) with specific patterns derived from a pattern such as PRBS10 for training and optimum generalization. Any non-linearity and mismatch in the positive and negative pulse paths can be modeled as the algorithm is very fast in that it contains no loop and no feedback. And the model may be easily implemented for digital signal processing (DSP).

Figure 6:
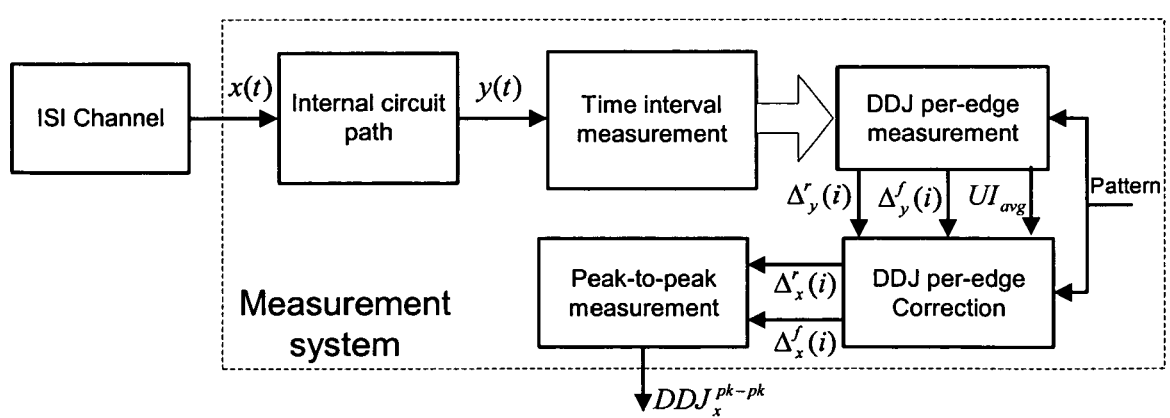
FIG. 6 illustrates a measurement system block diagram for data-dependant jitter (DDJ) measurement with calibration in correction mode of operation.

FIG. 6 shows a measurement system in DDJ measurement mode x(t) is the input signal pattern and y(t) is the internal path signal that actually is measured by the measurement system. Sampled CTIA data is passed to "DDJ per-edge measurement" module for obtaining DDJ values for all rising ($\Delta_y^r(i)$) and falling ($\Delta_y^f(i)$) edges using virtual pattern marker technique (refer to notations section for definition of indices and DDJ measurement document). This module also measures $UI_{avg}$ that is the average UI estimated from data. "DDJ per-edge correction" module is the core of the DDJ calibration method. It accepts DDJ per-edge for y(t) and generates DDJ per-edge for x(t) ($\Delta_x^r(i)$ and $\Delta_x^f(i)$). Peak-to-peak DDJ ($DDJ_x^{pk-pk}$) of x(t) may then easily be calculated from $\Delta_x^r(i)$ and $\Delta_x^f(i)$.

An objective of the DDJ calibration process is to obtain parameters of an internal path neural network (NN) model by training. It is an off-line activity, which may be required every month or when there are significant changes in the environment. Parameters and correction offsets, i.e., calibration constants, derived from the neural network modeling may be store in a memory associated with the measurement system for retrieval and subsequent measurement correction. After calibration and during normal operation or correction stage, the parameters of the model will be used to obtain accurate estimation of per-edge DDJ values for x(t) ($\Delta_x^r(i)$ and $\Delta_x^f(i)$) from y(t) ($\Delta_y^r(i)$ and $\Delta_y^f(i)$) as shown in FIG. 6.

Figure 7:
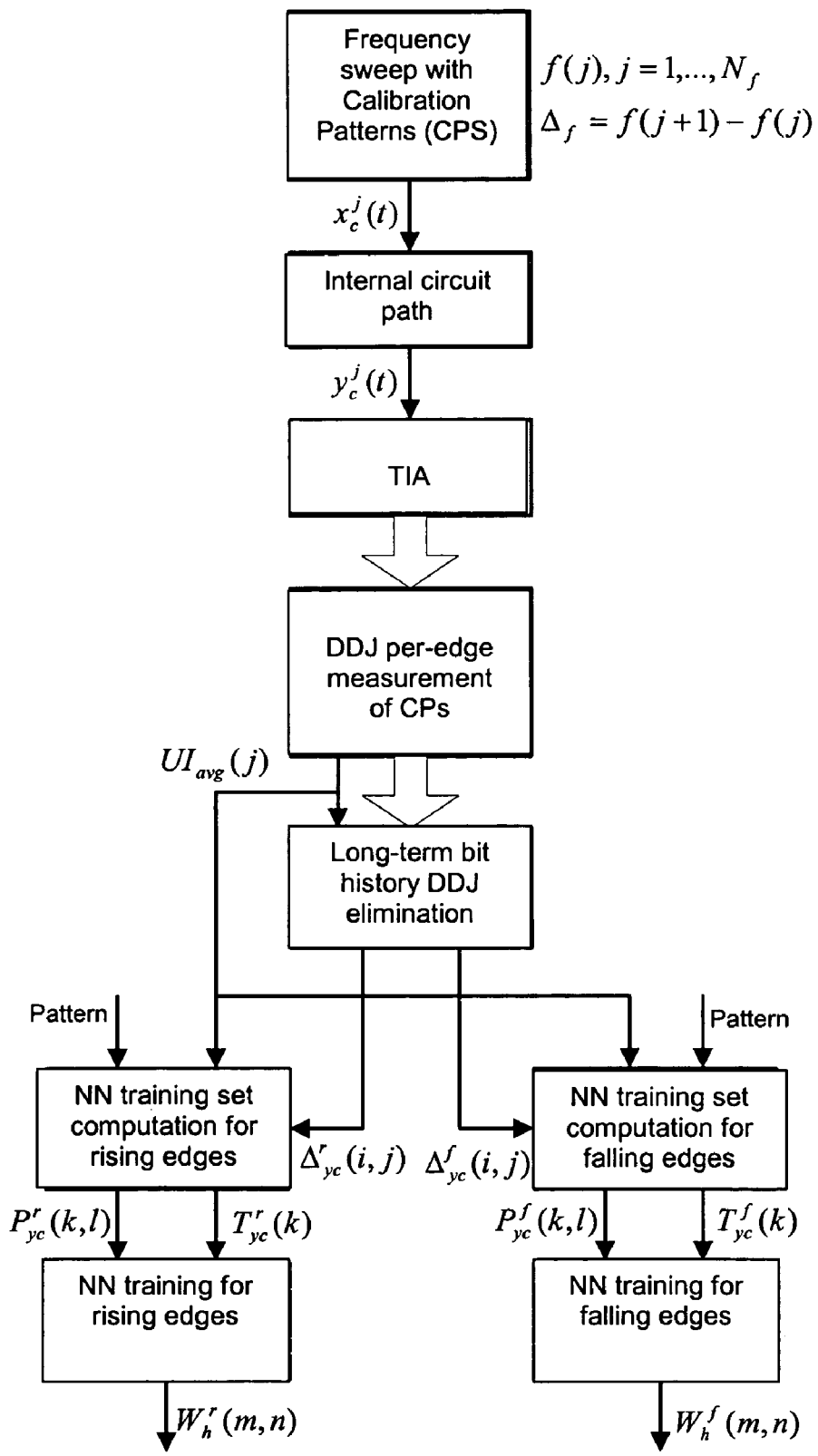
FIG. 7 is a flow chart representing an exemplary calibration process in accordance with the present subject matter.

FIG. 7 illustrates an exemplary calibration process in accordance with the present technology. The calibration input is a data signal with repeating pattern, which we refer to as Synthesized Calibration Patterns (SCPs). The calibration process uses a set of pre-determined bit rate, e.g., 1 Gbps to 3.2 Gbps with steps of 20 Mbps. In practice more than one pattern may be needed to remove long-term bit history related DDJ. Without long-term bit history DDJ elimination, the calibration may suffer significant loss of accuracy. The DDJ values plus bit history for each edge of the pattern are used to obtain input/output NN (Neural Network) training sets separately for rising and falling edges by "NN training set computation" modules. The DDJ calibration is applied for rising and falling edges separately for cancelling DCD effects and possible mismatch between positive and negative pulse paths in the equipment. The input and output training set will then be applied to "NN training" modules for training and computation of the network parameters ($W_h^r(m,n)$ and $W_h^f(m,n)$).

Figure 8:
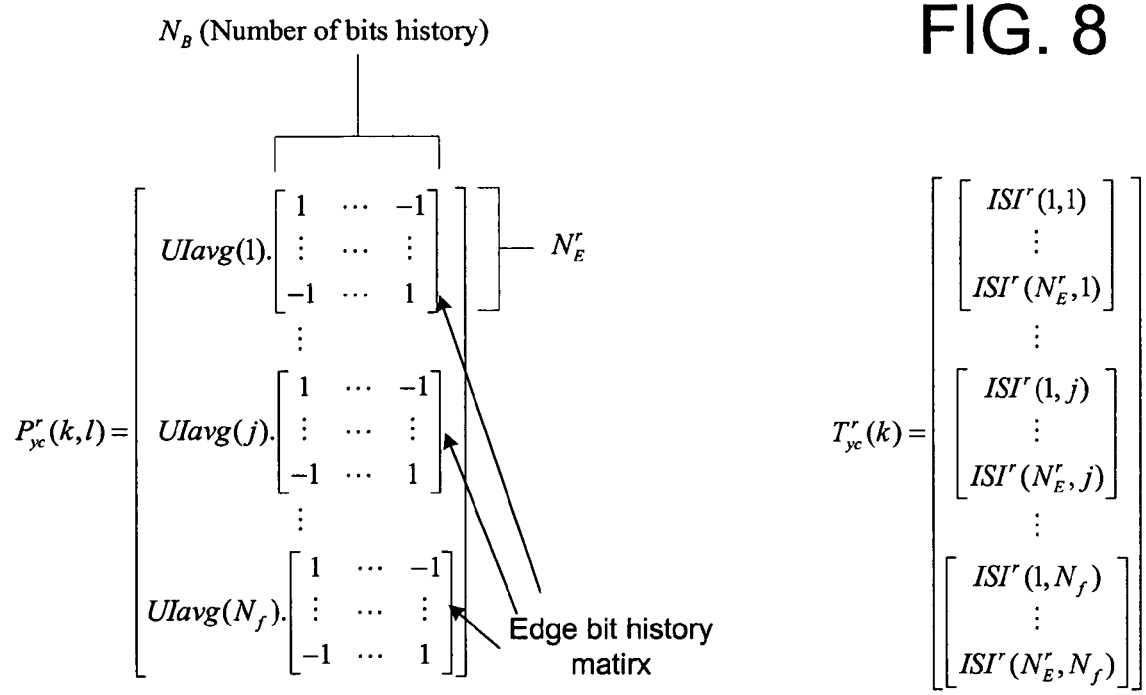
FIG. 8 illustrates the input data structure used to train the neural network system that models the DDJ impact.

The input training sets for a neural network (NNet) is derived from the $N_B$ bit history for each measured edge as follows:

$$UI_{avg}(k).hist(i,l)$$

where $UI_{avg}(k)$ is the $UI_{avg}$ estimate for the k-th bit rate selected, and hist(i,l) is a vector of with $N_B$ elements representing the bit history preceding the i-th pattern edge. hist(i,l) only contains −1 or 1 elements representing bits 0 and 1, respectively. For each bit rate, there exists a maximum of $N_E^r$ different bit histories, assuming the bit history preceding each edge is unique. The NNet input is formed as a matrix with $N_f N_E^r$ rows and $N_B$ columns, as shown in FIG. 8.

Similar matrix is formed for the falling edges ($P_{yc}^f(k,:)$). As seen in FIG. 8, $P_{yc}^r(k,:)$ matrix consists of $N_f$ sub-matrices arranged column-wise, each having $N_E^r \times N_B$ dimensions. The output training sets ($T_{yc}^r(k)$ and $T_{yc}^f(k)$) are vectors of size $N_f N_E^r$ that contain DDJ per-edge for different bit rates. Each row of P matrix ($P_{yc}^r(k,:)$) is related to one element of T vector ($T_{yc}^r(k)$). For example if the frequency sweep is performed from 500 Mbps to 3.2 Gbps with 100 Mbps step for PRBS10 pattern, $N_E^r = N_E^f = 256$ and $N_f = 28$. Assuming that $N_B = 10$, the dimension of $P_{yc}^r$ matrix and T vector will be 7168×10 and 7168×1.

Figure 9:
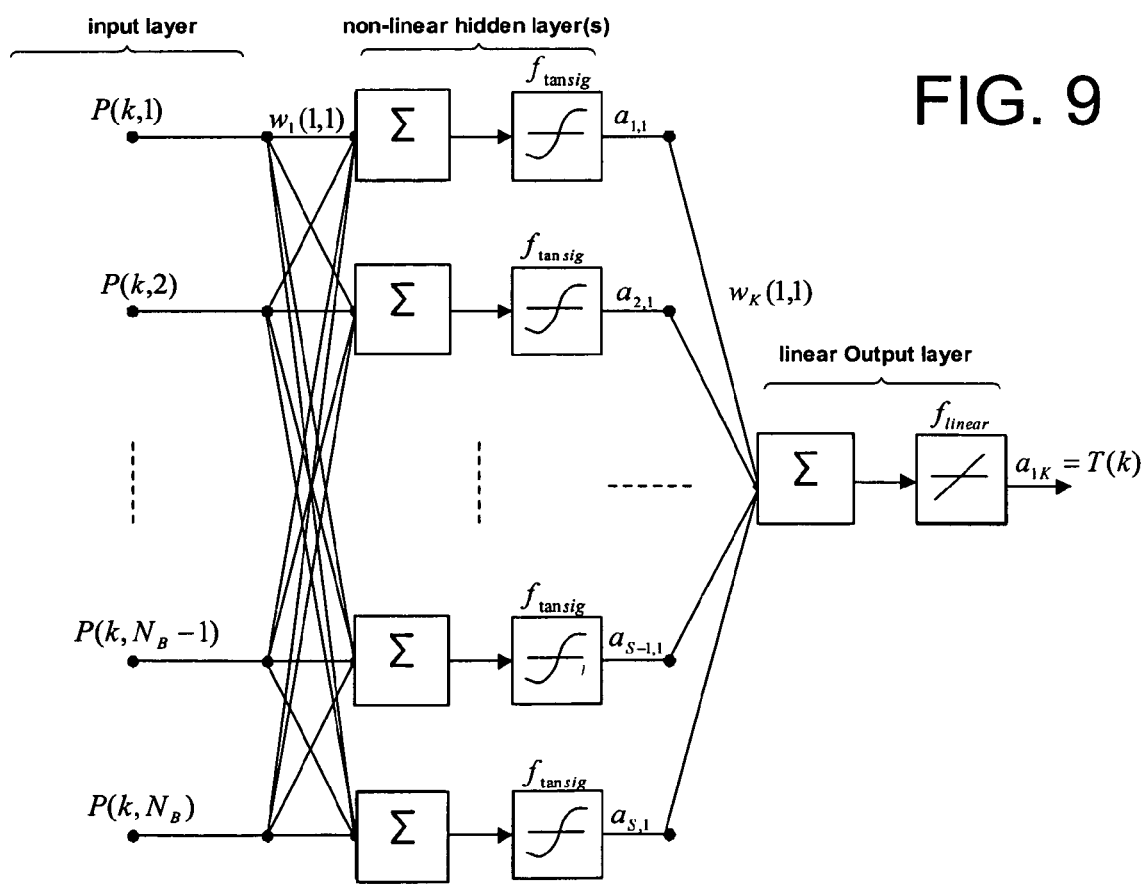
FIG. 9 is a block diagram illustrating an exemplary feed forward neural network architecture.

At this point assume that $P_{yc}^r$ and $P_{yc}^f$ matrices and $T_{yc}^r$ and $T_{yc}^f$ vectors for rising and falling edges are obtained in the previous stage. FIG. 9 shows the architecture of the proposed Feed Forward Neural Network (FFNN) with back-propagation algorithm for training. This network has $N_B$ inputs and one output. The number of optimum hidden layers and neurons in each layer depends on the complexity of the problem. The best way to find the optimum number of hidden layers and neurons in each layer is Mote Carlo experiment. In each trial of Monte Carlo experiment, after changing the number of layers, neurons per layer and training, a test pattern is applied to the network and RMS error is recorded as a criterion for finding optimum architecture. Monte Carlo experiment with real data has shown that the optimum architecture is two hidden layer network with 9 neurons in hidden layer one and 7 neurons in hidden layer two. For training the neural network Backpropagation LM (Levenberg-Marquardt) algorithm with learning rate of 3.37 is used. This algorithm appears to be the fastest method for training moderate-sized feedforward neural networks (up to several hundred weights). The results of training stage are $W_h^r(m,n)$ and $W_h^f(m,n)$ weighting parameters of NNet. $W_h^r(m,n)$ is the weight between output of neuron n in h layer to the input of neuron m in h+1 layer.

Figure 10:
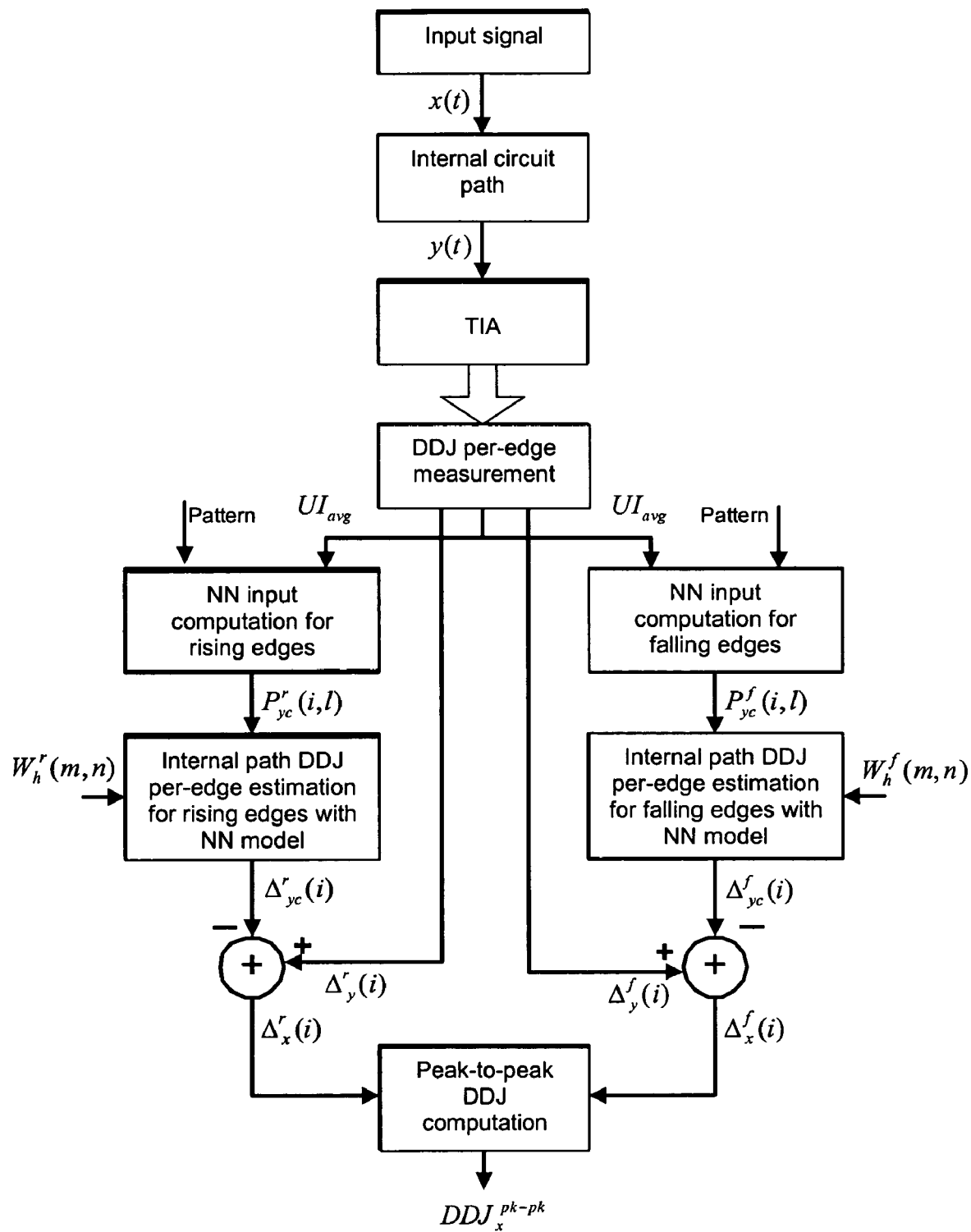
FIG. 10 illustrates en exemplary data-dependant jitter (DDJ) correction process in accordance with the present subject matter.

An exemplary correction process in normal operation is shown in FIG. 10. After calibration, the model parameters can be used in normal operation of equipment for estimating the DDJ per-edge of any pattern at any frequency. The objective is measuring DDJ per-edge for x(t) ($\Delta_x^r(i)$ and $\Delta_x^f(i)$) from the DDJ measurement data of y(t) ($\Delta_y^r(i)$, $\Delta_y^f(i)$ and $UI_{avg}$) that is measured by "DDJ per-edge measurement" module.

The pattern and $UI_{avg}$ is fed into neural network input computation module for obtaining $P_{yc}^r(i,l)$ ($P_{yc}^f(i,l)$) that is $N_E^r \times N_b$ matrix containing bit histories for rising (falling) edges. Then, the rising and falling edge input matrices are applied to the networks with $W_h^r(m,n)$ and $W_h^f(m,n)$ parameters at a time to obtain $\Delta_{yc}^r(i)$ and $\Delta_{yc}^f(i)$. These are DDJ per-edge added by internal path to the input signal. If we assume that the path has a linear effect on each individual edge, as the first approximation we have:

$$\Delta_x^r(i) = \Delta_y^r(i) - \Delta_{yc}^r(i) \quad i=1,2,\ldots,N_E^r$$

$$\Delta_x^f(i) = \Delta_y^f(i) - \Delta_{yc}^f(i) \quad i=1,2,\ldots,N_E^f$$

$$DDJ_x^{pk-pk} = \max(\max(\Delta_x^r(i)),\max(\Delta_x^f(i))) - \min(\min(\Delta_x^r(i)),\min(\Delta_x^f(i))) \quad \text{Eq. 4}$$

In general, this is a non-linear effect that depends on the input signal shape or ISI channel filtering effect. An exemplary algorithm for implementing corrections assumes that the following information from training stage and DDJ measurements is computed and ready to be loaded into the memory:

Number of neurons in each layer: $N_B$=WI_nrns, WH1_nrns, WH2_nrns (neural network is assumed to have two hidden layers)

Neural network weighting matrices for rising edges: WIr, WHr, Wor

Neural network weighting matrices for falling edges: WIf, WHf Wof

Input pattern: pat

Number of rising or falling edges: $N_E^r$ ($N_E^f$)

Uncalibrated Per-edge shift for rising (falling) edges of y(t) from measurements: $\Delta_y^r$ ($\Delta_y^f$)

The algorithm is based on the DDJ correction block diagram in FIG. 10. It consists of two subroutines, MAKE_INPUT_PATTERNS and SIMULATE_NN that are called in main function COMPENSATE_DDJ. MAKE_INPUT_PATTERNS generates neural network inputs for rising and falling edges ($P_{yc}^r$(i,l) ($P_{yc}^f$(i,l))). SIMULATE_NN simulates neural network based on the inputs and weighting factors and generates internal path DDJ for a given edge. COMPENSATE_DDJ uses the DDJ measurement results and calls the above subroutines to obtain DDJ per-edge estimate of input signal.

Figure 11:
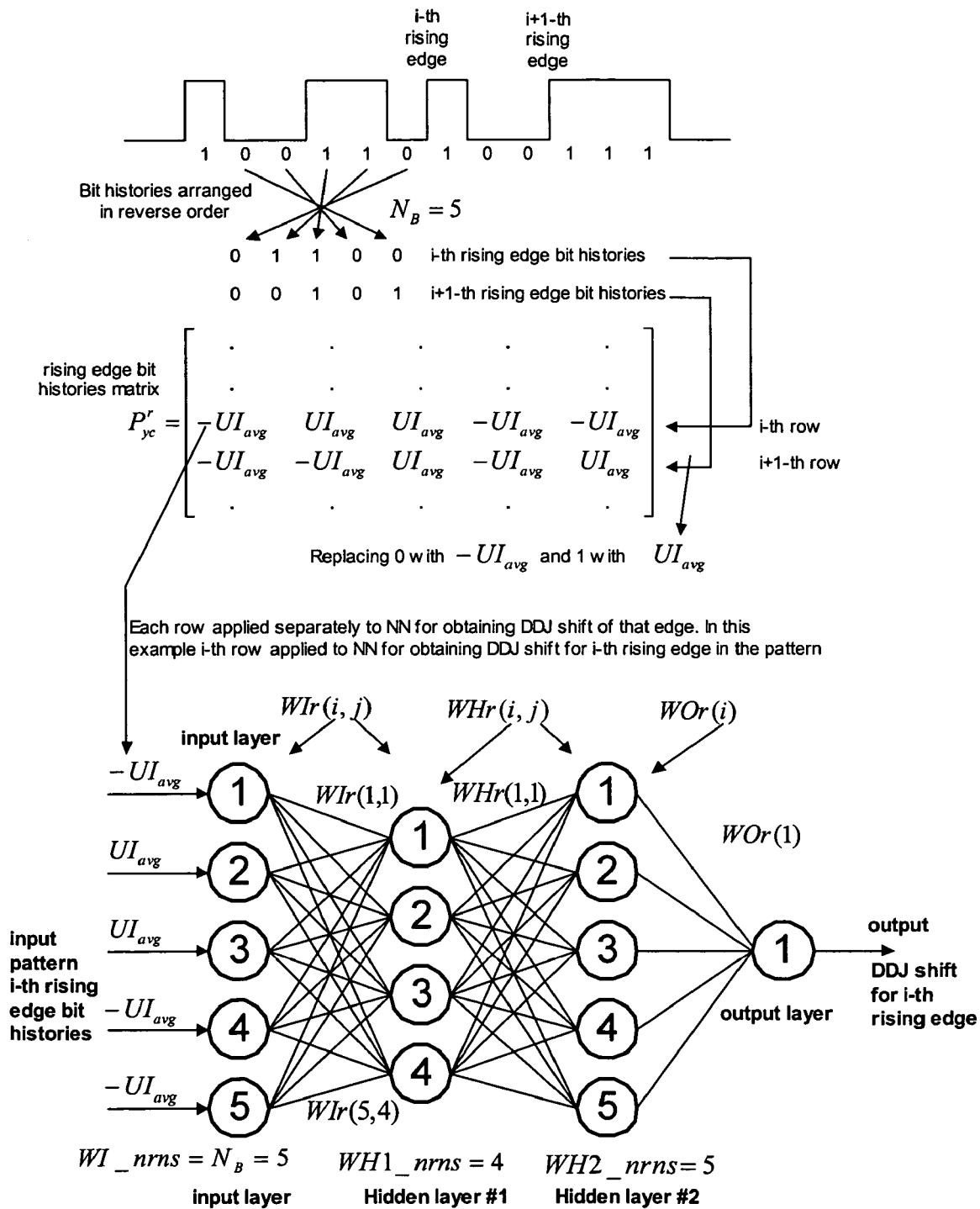
FIG. 11 illustrates exemplary feed forward neuron network architecture.

FIG. 11 shows an example of how bit histories matrix ($P_{yc}^r$) for rising edges of a pattern is formed by MAKE_INPUT_PATTERNS subroutine (falling edge is identical to rising edge). In this example WI_nrns=$N_B$=5, WH1_nrns=4 and WH2_nrns=5 for simplicity (only 5 bit histories before each edge is used in computation). The optimum value of $N_B$ and other NNet parameters are listed in the next section (Notations). As shown in this figure, each row of $P_{yc}^r$ contains $N_B$ bit histories of a rising edge in the pattern in the form of (–$UI_{avg}$, $UI_{avg}$) instead of (0,1). For estimation of DDJ shift for i-th rising edge of the pattern, i-th row of $P_{yc}^r$ have to be applied to neural network.

The following is a summary of notations and assumptions that are used throughout this document:

| Parameter | Definition | Example for PRBS7 and 2.5 Gbps and optimum NN architecture |
|---|---|---|
| $N_P$ | Pattern length in bits or UI | 127 |
| pat | Array of pattern bits | 011 . . . |
| $N_E$ | Number of pattern edges (rising and falling edges) | 64 |
| $N_E^r = N_E^f = N_E/2$ | Number of rising edges or falling edges | 32 |
| $N_B$ | Number of edge bit histories. Usually between 7 to 10 bit histories needed before each edge | 10 |
| $UI_{avg}$ | Average UI estimated from real data | 400 ps |
| x(t), y(t) | input and output signals of the measurement system internal path | |
| $x_c(t)$, $y_c(t)$ | Calibrated input and output signals | |
| $\Delta_y^r$(i) ($\Delta_y^f$(i)) | Uncalibrated Per-edge shift for i-th rising (falling) edge of y(t) | Array of 32 elements |

-continued

| Parameter | Definition | Example for PRBS7 and 2.5 Gbps and optimum NN architecture |
|---|---|---|
| $P_{yc}^r$(i, l) ($P_{yc}^f$(i, l)) | Neural network input matrix for rising (falling) edges. It has number of edges rows and $N_B$ columns. i-th row of the matrix, contains $N_B$ bit histories for the i-th edge of the pattern | 32 × 10 matrix |
| WI_nrns = $N_B$ | Number of neurons in input layer. | 10 |
| WH1_nrns | Number of neurons in hidden layer #1. | 12 |
| WH2_nrns | Number of neurons in hidden layer #2 | 9 |
| WIr(WIf) | WI_nrns × WH1_nrns matrix that contains weighting from the input layer to hidden layer #1 for rising (falling) edges. | 10 × 12 matrix |
| WHr(WHf) | WH1_nrns × WH2_nrns matrix that contains weighting from the hidden layer #1 to hidden layer #2 for rising (falling) edges. | 12 × 9 matrix |
| WOr(WOf) | WH2_nrns × 1 array that contains weighting from the hidden layer #2 to the output layer for rising (falling) edges. | Array of 9 elements |
| $f_s(x) = \dfrac{2}{1+e^{-2x}} - 1$ | Activation function or transfer function of the Neural Network | |

The following is an exemplary subroutines for implementing selected identified subroutines for the implementation of the DDJ correction methodology in accordance with the present technology:

MAKE_INPUT_PATTERNS SUBROUTINE

Inputs:
1. pat //Input pattern array
2. $UI_{avg}$//Averaged UI measured from data
3. $N_B$//Number of bit history needed for each edge
4. rf_flag //rising/falling edge flag; 0 for falling edge and 1 for rising edges Outputs:
1. bit_hist //$N_E^r$×$N_B$ Matrix that contains bit histories for each rising or falling edges. The i-th row of this matrix contains the bit history before the i-th edge of the pattern.

Subroutine:
1. Start
2. Compute the length of the pat array and put in $N_P$ variable
3. Make pat_extd array by appending the first element of the pat at the end of pat array: pat_extd=[pat pat(1)]
4. Compute: diff=pat_extd(i)–pat_extd(i–1); for i=2, . . . , $N_P$+1
5. Find the non-zero elements of diff and put the index of them into pat_edges variable
6. if(rf_flag==1)
7. Put the odd elements (i=1:2:end) of pat edges into pat_rise_fall_edge array (rising edges indices)

8. else
9. Put the even elements (i=2:2:end) of pat edges into pat_rise_fall_edge array (falling edges indices)
10. end if
11. For j=1, . . . , $N_E^r$ do:
12. temp=pat;
13. if(pat_rise_fall_edge(j)<$N_B$):
14. Perform circular shift to pat array ($N_B$—pat_rise_fall_edge(j)) times to the right if it is positive and to the left if it is negative and put the results into temp (pat array shouldn't be changed)
15. bit_hist(j,1:1:$N_B$)=temp($N_B$:-1:1)
16. else bit_hist(j,1:1:$N_B$)=temp(pat_rise_fall_edge(j):-1:pat_rise_fall_edge(j)-$N_B$)
17. end if
18. Find zero elements of bit_hist and change them to -1
19. Multiply all elements of bit_hist by $UI_{avg}$
20. End SIMULATE_NN SUBROUTINE
Inputs:
1. WI //WI_nrns×WH1_nrns matrix that contains weighting from the input layer to hidden layer #1
2. WH //WH1_nrns×WH2_nrns matrix that contains weighting from the hidden layer #1 to hidden layer #2
3. WO //WH2_nrns×1 array that contains weighting from the hidden layer #2 to the output layer
4. WI_nrns //number of neurons in input layer
5. WH1_nrns //number of neurons in hidden layer #1
6. WH2_nrns //number of neurons in hidden layer #2
7. input$_{13}$ pattern //array of WI_nrns length of input bit histories
Outputs
1. DDJ_per edge //DDJ per-edge result from NN simulation for rising/falling edges
Subroutine:
1. Start
2. Compute:

$$AH1(i) = f_s\left(\sum_{k=1}^{WI\_nrns} input\_pattern(k) * WI(k, i)\right) \text{ for } i = 1, \ldots, WH1\_nrns$$

3. Compute AH2 from AH1 as follows:

$$AH2(i) = f_s\left(\sum_{k=1}^{WH1\_nrns} AH1(k) * WH(k, i)\right) \text{ for } i = 1, \ldots, WH2\_nrns$$

4. Compute output:

$$DDJ\_per\_edge = \sum_{k=1}^{WH2\_nrns} AH2(k) * WO(k)$$

5. End
where $$f_s(x) = \frac{2}{1 + e^{-2x}} - 1$$

is the activation function (transfer function) of the neural network

COMPENSATE_DDJ MAIN ROUTINE
1. Start
2. Load: WIr, WHr, Wor, WIf, WHf, WOf, $N_B$=WI_nrns, WH1_nrns, WH2_nrns, pat, $N_E^r(N_E^f)$, $\Delta_y^r$, $\Delta_y^f$, $UI_{avg}$
3. $P_{yc}^r$=MAKE_INPUT_PATTERNS(pat, $UI_{avg}$, $N_B$, 1);
4. $P_{yc}^f$=MAKE_INPUT_PATTERNS(pat, $UI_{avg}$, $N_B$, 0);
5. for i=1, . . . , $N_E^r$ do
6. Compute DDJ per rising edge for internal path:
$\Delta_{yc}^r(i)$=SIMULATE_NN(WIr, WHr, Wor, WI_nrns, WH1_nrns, WH2_nrns, $P_{yc}^r(i,:)$)
7. Compute DDJ per falling edge for internal path:
$\Delta_{yc}^f(i)$=SIMULATE_NN(WIf, WHf, Wof, WI_nrns, WH1_nrns, WH2_nrns, $P_{yc}^f(i,:)$)
8. Compute DDJ per rising edge for input signal: $\Delta_x^r(i)=\Delta_y^r(i)-\Delta_{yc}^r(i)$
9. Compute DDJ per falling edge for input signal: $\Delta_x^f(i)=\Delta_y^f(i)-\Delta_{yc}^f(i)$
10. end for
11. Compute $DDJ_x^{pk-pk}$ for input signal:
$DDJ_x^{pk-pk}$=max(max($\Delta_x^r(i)$),max($\Delta_x^f(i)$))−min(min($\Delta_x^r(i)$),min($\Delta_x^f(i)$))
where I=1, . . . , $N_E^r(N_E^f)$
12. report $DDJ_x^{pk-pk}$
13. End While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for calibrating a measurement system to compensate for data-dependant jitter (DDJ), comprising the steps of:
applying a predetermined signal set to the measurement system;
measuring inter-symbol interference (ISI) and duty-cycle distortion (DCD); and
generating and storing correction offsets based on the measured ISI and DCD,
whereby predetermined offsets may be made available to correct signal measurements of signals including data-dependant jitter.

2. The method of claim 1, further comprising the steps of:
using the measured ISI and DCD to train a neural network to produce measurement correction offsets; and
storing the neural network produced measurement correction offsets to correct signal measurements of signals including data-dependant jitter.

3. The method of claim 1, wherein the step of applying comprises applying a selected finite set of pseudo random binary signals (PRBS) to the measurement system.

4. The method of claim 3, wherein the step of applying comprises applying a single pattern PBRS10 sequence to the measurement system.

5. The method of claim 1, wherein the step of applying comprises the steps of:
selecting a first predetermined number of data bits representing a short-term history;

selecting a second predetermined number of data bits representing a long-term history; and applying a signal set to the measurement system comprising a pattern corresponding to the first and second predetermined sets each being repeated twice within the pattern, wherein the first predetermined set is repeated with the same polarity and the second predetermined set is repeated with an inverse polarity.

6. The method of claim 2, wherein the step of using comprises using the measured ISI and DCD to train a feed-forward neural network to produce measurement correction offsets.

7. The method of claim 6, further comprising the step of providing the feed-forward neural network as a two hidden layer network with nine neurons in the first hidden layer and seven neurons in the second hidden layer.

8. The method of claim 1, further comprising the step of eliminating ISI due to long-term bit history.

9. A method of producing corrected signal measurements to compensate for data-dependant jitter (DDJ), comprising the steps of:

providing a measurement system including signal measurement circuitry and a memory;

applying a predetermined signal set to the measurement system;

measuring inter-symbol interference (ISI) and duty-cycle distortion (DCD);

generating and storing correction offsets based on the measured ISI and DCD in the memory;

applying a test signal to the measurement system; and subtracting correction offsets stored in the memory from the test signal on a bit-by-bit basis.

10. The method of claim 9, further comprising the steps of:

using the measured ISI and DCD to train a neural network to produce the correction offsets; and storing the neural network produced correction offsets in the memory.

11. The method of claim 9, wherein the step of applying a predetermined test signal comprises applying a selected finite set of pseudo random binary signals (PRBS) to the measurement system.

12. The method of claim 11, wherein the step of applying a predetermined test signal comprises applying a single pattern PBRS 10 sequence to the measurement system.

13. The method of claim 9, wherein the step of applying a predetermined test signal comprises the steps of:

selecting a first predetermined number of data bits representing a short-term history;

selecting a second predetermined number of data bits representing a long-term history; and applying a signal set to the measurement system comprising a pattern corresponding to the first and second predetermined sets each being repeated twice within the pattern, wherein the first predetermined set is repeated with the same polarity and the second predetermined set is repeated with an inverse polarity.

14. The method of claim 10, wherein the step of using comprises using the measured ISI and DCD to train a feed-forward neural network to produce measurement correction offsets.

15. The method of claim 14, further comprising the step of providing the feed-forward neural network as a two hidden layer network with nine neurons in the first hidden layer and seven neurons in the second hidden layer.

16. The method of claim 9, further comprising the step of eliminating ISI due to long-term bit history.

* * * * *